US012641317B2

(12) United States Patent
Stokes

(10) Patent No.: US 12,641,317 B2
(45) Date of Patent: May 26, 2026

(54) USER-TO-USER DEDICATION OF DIGITAL ENTERTAINMENT MEDIA WITH PERSONALIZED MESSAGES

(71) Applicant: Gavin Stokes, Woodland Hills, CA (US)

(72) Inventor: Gavin Stokes, Woodland Hills, CA (US)

( * ) Notice: Subject to any disclaimer, the term of this patent is extended or adjusted under 35 U.S.C. 154(b) by 85 days.

(21) Appl. No.: 18/644,046

(22) Filed: Apr. 23, 2024

(65) Prior Publication Data

US 2024/0364973 A1     Oct. 31, 2024

Related U.S. Application Data

(60) Provisional application No. 63/498,724, filed on Apr. 27, 2023.

(51) Int. Cl.
H04N 21/4788     (2011.01)
H04N 21/442     (2011.01)
H04N 21/81     (2011.01)

(52) U.S. Cl.
CPC ... H04N 21/4788 (2013.01); H04N 21/44204 (2013.01); H04N 21/8126 (2013.01)

(58) Field of Classification Search
CPC ......... H04N 21/4788; H04N 21/44204; H04N 21/8126
See application file for complete search history.

(56) References Cited

U.S. PATENT DOCUMENTS

| | | | |
|---|---|---|---|
| 10,555,022 B2 | 2/2020 | Green et al. | |
| 11,166,085 B2 | 11/2021 | Lewis et al. | |
| 2011/0112921 A1* | 5/2011 | Kennewick | G06Q 30/0601 |
| | | | 705/26.1 |
| 2012/0215863 A1* | 8/2012 | Huynh | H04L 51/212 |
| | | | 709/206 |
| 2019/0075064 A1* | 3/2019 | Murphy | H04L 51/18 |
| 2019/0215557 A1* | 7/2019 | You | H04N 21/4312 |
| 2020/0162536 A1* | 5/2020 | Vincent | H04L 65/611 |
| 2022/0276827 A1* | 9/2022 | Le-Nindre | H04R 3/00 |

* cited by examiner

*Primary Examiner* — Gigi L Dubasky
(74) *Attorney, Agent, or Firm* — Play-N-Plug IP Law, PLLC

(57)     ABSTRACT

An end-user application ("Application") may take the form of a media-player software application, a controller software for a media-player application, or a component of a media-player application running on a computer or mobile device. The Application affords a transmitting user the ability to record, generate, or select media to be presented to a receiving user (or users) with or without prior notification to the other user. The Application affords the receiving user the ability to retrieve, deliberately or not, and play back content generated or selected by the transmitting user before, after, or during playback of other media. An example of such a message would be a "song dedication," where the transmitting user would record a message to the receiving user, to be played back before the receiving user hears a particular song.

18 Claims, 8 Drawing Sheets

DEDICATOR DEVICE 302

RECIPIENT DEVICE 502

USER-TO-USER DEDICATION OF DIGITAL ENTERTAINMENT MEDIA WITH PERSONALIZED MESSAGES

BACKGROUND

Radio stations have, for decades, presented "dedication" shows. During these shows, listeners can call in and request that a song be dedicated to another listener with a personal message. Part of the appeal of such shows is the surprise and (a dedicator hopes) delight with which a listener may unexpectedly hear a dedication made to him or her.

With the declining popularity of over-the-air broadcasting, and the ascendance of streaming media on the Internet, would-be dedicators and recipients are left without analogous options to deliver and receive such "surprise" communications in conjunction with music or other media. Streaming services do not provide a universal, on-demand, always-available mechanism for the delivery of personal messages to their users in conjunction with the use of those services. This includes the above-described dedications or surprise communications.

Some previous methods for the introduction of tertiary content into a sequence of media focus on the temporal positioning of interstitial content in relation to sections of each primary "media content item." (e.g., U.S. Pat. No. 11,166,085 to Lewis et al.). Lewis provides no user-to-user communications, user selection, user-defined access or privacy limitations, or user-defined delivery conditions for the interstitial material. Other previous methods, which provide for the provision of a mediacast with lead-ins (e.g., U.S. Pat. No. 10,555,022 to Green et al.), focus on the customization of material for multiple users consuming multicast (broadcast) programming. However, Green does not disclose or describe user-to-user communications, user-defined access or privacy limitations, or user-defined delivery conditions for the "lead-in" material.

Thus, previous approaches do not cover user-defined content being inserted into another user's media consumption. Accordingly, there is a need for the conveyance of such communications through methods, apparatuses and systems for media playback with optional remote media curation and personalized media introduction by another user.

Brief Summary

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

The present disclosure is illustrated by way of example, and not by way of limitation, in the figures of the accompanying drawings.

DETAILED DESCRIPTION

An application is supported by an online server system (hereinafter "server") comprising server computers (real or virtual), data storage, and server applications (e.g., a server application as shown and described in FIG. 1, FIG. 6 and FIG. 7 below). In some embodiments, the ability to send an individual message, a number of messages, or messages over a period of time, either in the application or online, may be enabled by a user purchase.

Figure 1:
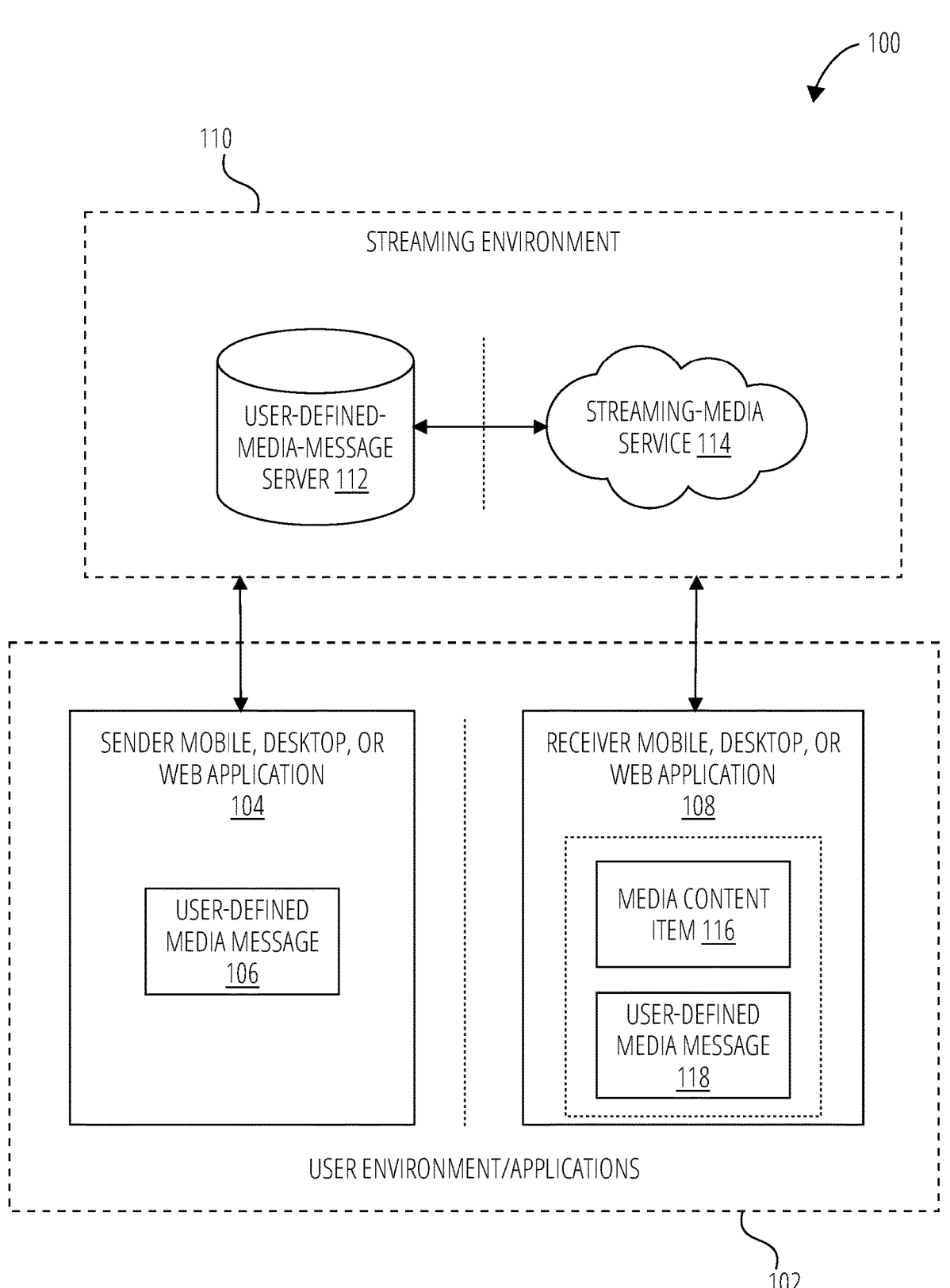
FIG. 1 illustrates a diagram in simplified form of an example network architecture according to an embodiment of the present disclosure.

FIG. 1 illustrates a diagram in simplified form of an example network architecture 100 according to an embodiment of the present disclosure. Network architecture 100 includes a user environment 102 and a streaming environment 110. User environment 102 and streaming environment 110 can be in two-way communication, enabling the sending, receiving and control of messaging for a dedication service. Execution of user applications in the user environment 102 can provide for the sending and receiving of surprise dedications featuring personalized a media introduction generated or selected by another user in the user environment 102.

User environment 102 may include a dedicator application 104 and a recipient application 108. In some embodiments, the dedicator application 104 and recipient application 108 can take the form of two different applications, as represented by the dotted line in FIG. 1. For instance, dedicator application 104 can be a specialized application allowing for the creation, generation and/or selection of dedications, while recipient application 108 can be a standard music streaming application used for music playback/streaming. Recipient application 108 can also be a specialized application to receive or play back dedications and associated media. Dedicator application 104 can be an application found on the device of a first user, while recipient application 108 can be an application found on the device of a second user or multiple users.

In other embodiments dedicator application 104 and recipient application 108 can be consolidated into a single media application that allows for both the sending and the receiving of user-defined media messages 106 and/or user-defined media messages 118. As an example, a streaming service may have a single application used to stream content, such as audio music files. The application(s) is not limited to audio music files and other types of media, such as videos, photos, and other combinations of audio/visual content can be consumed by users of the application(s). In some cases, a first user can have both a dedicator application 104 and a recipient application 108 as part of the consolidated media application on a first device, while a second user can have a second instance of a dedicator application 104 and a recipient application 108 as part of a second consolidated media application on a second device.

Dedicator application 104 may allow for the creation of one or more user-defined media messages 106 as described above and below. In some embodiments, dedicator application 104 provides a user with the ability to record, generate, or select from existing media one or more of audio recordings, still images or sequences thereof, video recordings, text, and/or hyperlinks to online content. Dedicator application 104 may also offer "filters" or effects that the user can apply to his or her messages, such as reverb or auto-tune for audio messages in some embodiments. The recordings, generated media, and selections can be contained in the one or more user-defined media messages 106, which can be transmitted to streaming environment 110. In some instances, dedicator application 104 may be in communication with streaming environment 110 through one of a variety of network connections, such as a cellular network, a local-access network (LAN), a wide-area LAN (WLAN), an ethernet connection, a Wi-Fi connection, or other form of internet-enabled access.

Dedicator application 104 provides a transmitting user the ability to identify and select media to which his or her message will be attached, if such attachment is desired. Selection may be done through an metadata-based search facility or from a browser provided by dedicator application 104. Matching for the user-defined media message 106 may be accomplished using media metadata (such as song title and artist) or data analysis (such as audio waveform matching) by recipient application 108. By using text-based metadata matching or media-data analysis (such as waveform matching), dedicator application 104 may support media curation between users of different media-streaming services. In alternative embodiments, dedicator application 104 may allow for delivery to a recipient application 108 that is not associated with any media-streaming service, but has access to media content items stored locally.

Dedicator application 104 will provide the "surprise" factor of an unexpected message by enabling recipient application 108 to play back a user-defined media message 118 (i.e., a received instance of a user-defined media message 106), without warning, the next time the recipient user chooses to listen to or view the media to which it is attached. Alternatively, the playback of the user-defined media message 118 (and media to which it is attached, if any, such as a song) may also occur unexpectedly to the recipient if such "playback hijacking" is allowed in recipient application 108. This affords a dedicator/sender increased likelihood that the recipient will receive the message and consume the media to which it is attached, and affords the recipient the entertainment of an unexpected message.

Unlike broadcast radio, where sender and recipient have little choice in when and if the message will be heard, the use of dedicator application 104 and recipient application 108 provides the ability to choose when and if it will be heard. Privacy, practicality, and entertainment concerns dictate that both sender and recipient have a say in who can intrude upon one's media experience and what users can discover about each other.

Streaming environment 110 includes user-defined-media-message server 112 and streaming-media service 114. User-defined-media-message server 112 receives user-defined media messages 106 from one or more dedicator applications 104 to allow for delivery to one or more recipient applications 108 as user-defined media messages 118. Streaming-media service 114 can send media content items 116 to one or more recipient applications 108, along with user-defined media messages 118. According to some embodiments, streaming-media service 114 transmits messages, such as a user-defined media message 118 from user-defined-media-message server 112 in conjunction with transmitting a media content item 116, in order to provide a dedication to the user of recipient application 108.

In some embodiments, the user-defined-media-message server 112 and the streaming-media service 114 may be consolidated into a single service. As an example, a streaming music service or a streaming multimedia service may include both user-defined-media-message server 112 and streaming-media service 114. In other embodiments, user-defined-media-message server 112 may be part of a different streaming-media service than streaming-media service 114 in communication with recipient application 108, as shown by the dotted line in streaming environment 110.

Subsequent to creation or selection, the user-defined media message 106 can be uploaded to the user-defined-media-message server 112 and/or stored locally on the generating user's device (i.e., a device containing dedicator application 104) for later delivery. In some embodiments, one or more user-defined media messages 106 may be played directly from online storage, such as directly from user-defined-media-message server 112. Depending on network-performance and data-storage considerations, transmitted media content items 116 and user-defined media messages 118 may be downloaded and stored on a device containing recipient application 108 by recipient application 108 for playback at a prescribed time.

Figure 2:
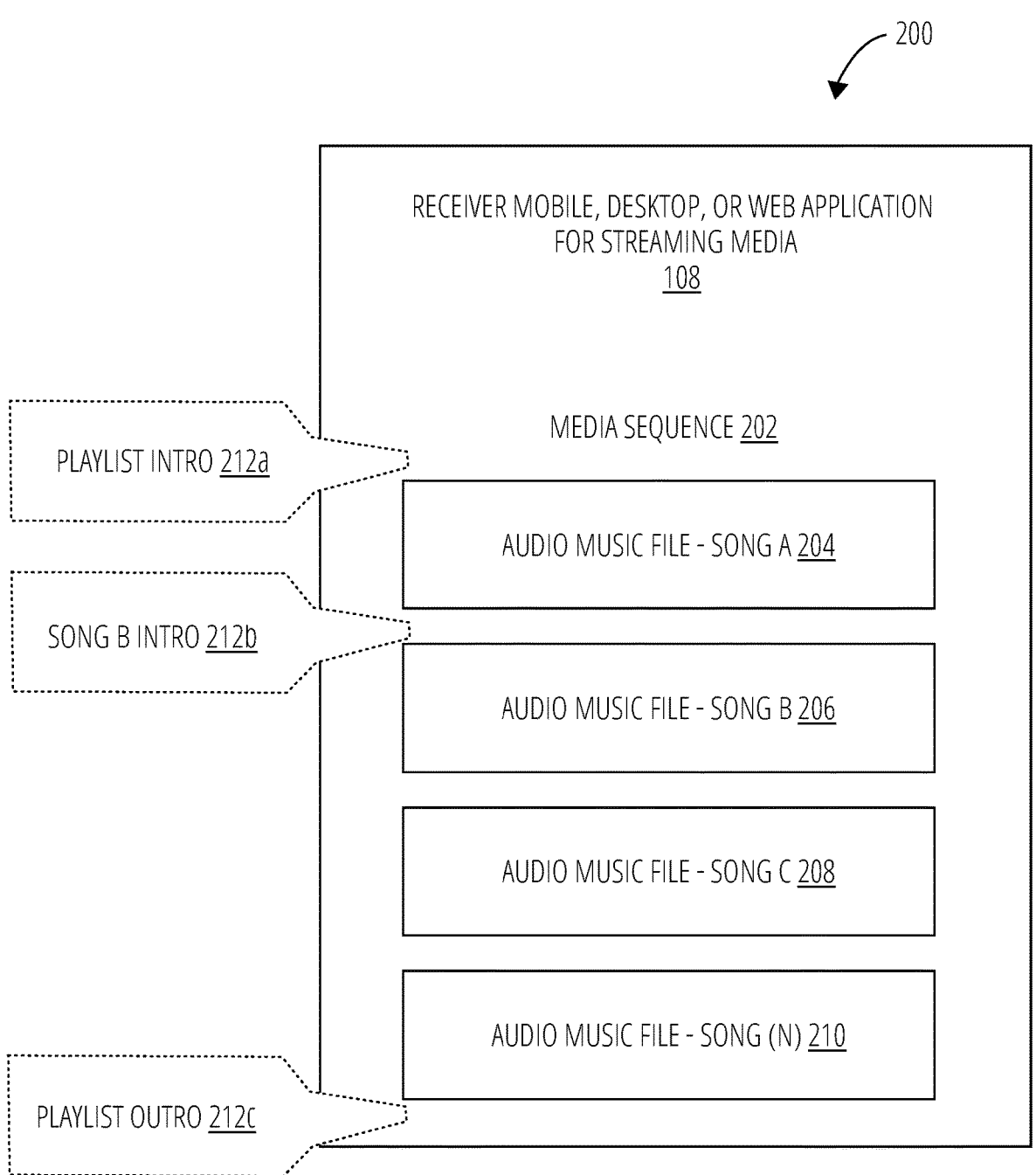
FIG. 2 illustrates the sequence of media playback in a receiver application, according to an embodiment of the present disclosure.

FIG. 2 illustrates the media-playback sequence in a recipient application according to an embodiment of the present disclosure. A receiver media presentation 200 includes a recipient application 108, which displays at least a portion of a media sequence 202 having some number of N media files. As shown in FIG. 2, media sequence 202 includes an audio music file 204 for a song A, an audio music file 206 for a song B, an audio music file 208 for a song C, and an audio music file 210 for a final song in the sequence denoted as song (N). One of skill in the relevant art will appreciate that while only four files are shown, media sequence 202 may contain any number of media files.

Receiver media presentation 200 as shown in FIG. 2 may include any one or more of a playlist intro 212a, a song B intro 212b, and a playlist outro 212c. As one example of a user-defined media message 106 or user-defined media message 118, playlist intro 212a can be a dedication message played prior to the start of media sequence 202. In other embodiments, playlist intro 212a may be a dedication message (i.e., user-defined media message 118) played before any playlist or before the specific song A found in audio music file 204. Song B intro 212b may be a similar user-defined media message 118 played prior to the next play of song B found in audio music file 206.

Playback of a sender's message (e.g., user-defined media message 106 or user-defined media message 118) may occur upon the recipient's next usage of recipient application 108 to play any media, play specific media, or based on other criteria including. Criteria triggering the delivery and playback of user-defined media messages 106 and 118 may include one or more of: a geographic location of a recipient device having recipient application 108, a specific time or date, weather at the location of the recipient's device, a direct trigger by dedicator application 104, biometric readings on the recipient's device (such as pulse rate or blood-oxygen level), or physical activity detected by the recipient's device (e.g., an exercise state by a user).

Interruption of media sequence 202 may occur with a dedicator-selectable transition, such as a fade-out into user-defined media message 118, a "needle-scratch" sound effect, a "tape halt" sound effect, or other suitable audio indicator. Recipient application 108 also receives notification of a pending message. Dedicator application 104 offers the sender the ability to choose whether such a notification will appear. Upon receiving such a notification, the message and associated media (if any) can be played at recipient application 108. Dedicator application 104 may also allow selection of an expiration date, after which the message will not be played by recipient application 108.

Recipient application 108 can allow users to set up privacy and access levels as a potential message recipient. Thus, the configuration of recipient application 108 dictates authorized communication through the application and what level of control other users will have over the recipient's media-playback experience. Each user of dedicator application 104 or recipient application 108 will identify himself or herself by means of an account established through dedicator application 104, or through a third-party authentication provider (such as Apple ID provided by Apple Corp. of Cupertino, Calif.). Recipient application 108 will provide a user the ability to authorize other users to communicate through the application. The criteria by which they may be authorized include (but are not limited to):

Individual people or entities: dedicator application 104 or recipient application 108 will provide the means to discover other users through a search performed in the application and authorize them. This includes users or entities that the user chooses to "follow."

People in the user's contact list: dedicator application 104 or recipient application 108 will provide the means to select people from the user's "address book" or process the entire address book, and search the server for matching users. Furthermore, the Application may periodically re-examine the user's contacts and refresh the list of authorized senders.

Those in physical proximity: dedicator application 104 or recipient application 108 will allow the user to accept communications from anyone in a specific radius, or show a list (potentially with pictures and/or profile information) of those in proximity and allow the user to selectively authorize them. The user may optionally allow those in proximity to be notified that someone authorized them.

Invited users: dedicator application 104 or recipient application 108 may also offer an option to request authorization from other users, and to send selected people (non-users) invitations to download and use the application; through E-mail, text-messaging, or other media. Upon acceptance of such an invitation, the accepting user and inviting user may be automatically authorized to communicate with each other through the application.

Users whose media tastes are similar to the potential recipient user's, as expressed by the recipient user through manual selection in the application or calculated by the application through an analysis of media consumed by the user.

Users who happen to be consuming the same media at the same time as the potential recipient user.

Users who have registered for an event (such as a concert or airline flight) for which the potential recipient user has also registered. Such events may be identified by date, time, location, name, participant name, or an "event code" provided by event organizers or ticket vendors, and provided by the user to the application manually or by data exchange between the application vendor and the event organizer or ticket vendor.

Users of other applications or Web sites who have been identified as interesting by the potential message-recipient user (or by a service on that user's behalf). Those "interesting" users may be identified through cooperative data exchange or an application programming interface provided by the other application or Web site's vendor, or by the Application's use of credentials provided by the user to log into the other service and acquire the identifying data.

Any combination of the above criteria. For example, users in physical proximity who are going to the same concert as the potential message recipient.

Furthermore, the application may allow senders to remain anonymous (although still a member of all authorized users), and recipients to accept or block anonymously-sent messages.

A user may choose which data to expose to would-be message-senders or recipients. The application may offer several levels of data exposure and feedback to other users. These privacy options include at the least:

Allowing authorized users to view a user's favorite or most-often-played media. The Application may use this access to display lists or charts that rank the popularity of certain media within one's social circle, and to display a list of users who also enjoy a particular media item.

Allowing authorized users to view a personal profile.

Alerting a user to the fact that another user has authorized him or her to communicate through the Application.

Alerting a message-sender to the fact that the recipient has viewed or listened to a sent message.

Alerting a message-sender to the fact that the recipient is listening to or viewing a particular piece of media. This can facilitate a "live" message, described below.

Identifying a message's originator to the recipient, or allowing the originator to remain anonymous.

Figure 3A:
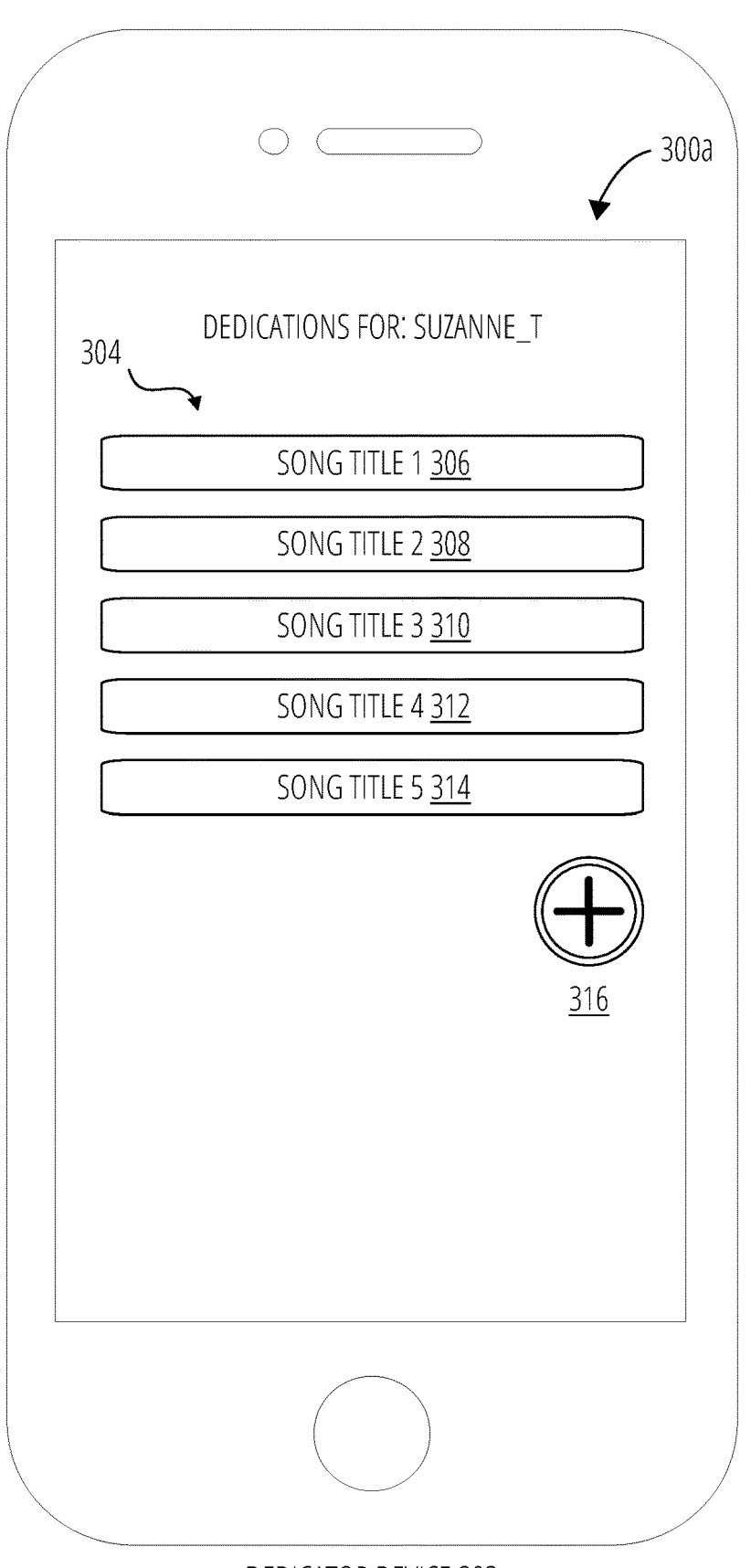
FIG. 3A illustrates a user interface for managing dedications created for a particular user according to an embodiment of the present disclosure.

FIG. 3A illustrates one aspect of a simplified sender interface 300*a* according to an embodiment of the present disclosure. Sender interface 300*a* is generated by a dedicator device 302 executing an application (e.g., dedicator application 104). Sender interface 300*a* as shown in FIG. 3A depicts the display of a dedication summary list 304 that the originating user has created for a particular recipient, illustrated in the figure as dedications for a user Suzanne T. Dedication summary list 304 is a list of user-defined media messages 106/118 to be delivered by the system to recipient application 108 (which may be another instance of the same application as dedicator application 104). Dedication summary list 304 includes song titles 306, 308, 310, 312, and 314, corresponding to song title 1 to song title 5, respectively.

Figure 3B:
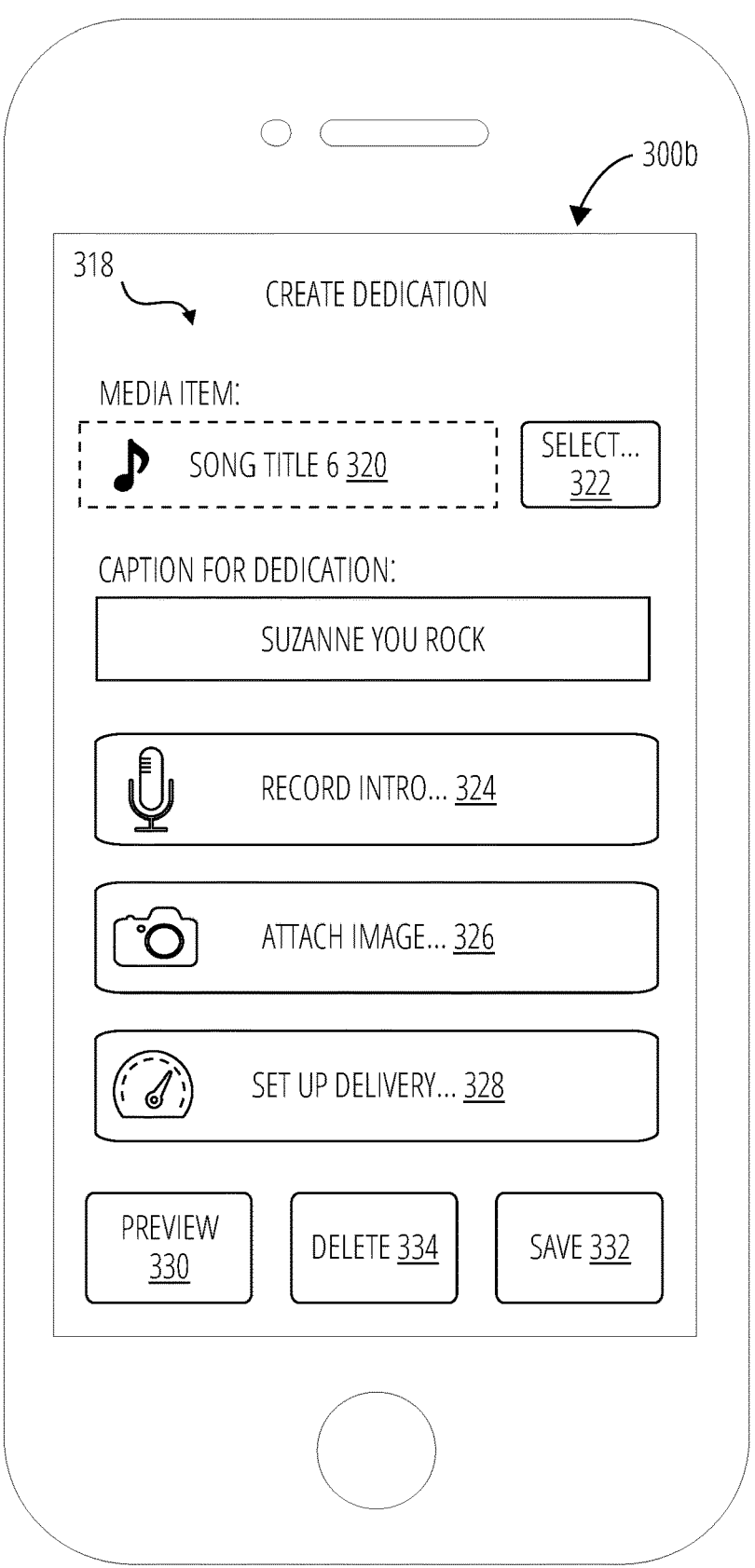
FIG. 3B illustrates a user interface for creating, editing, or deleting a dedication according to an embodiment of the present disclosure.

Also depicted in sender interface 300*a* of FIG. 3A is a message-adding affordance 316. Selecting this control will invoke a sender interface 300*b*, which is an interface enabling detailed message creation and message editing as depicted in FIG. 3B. In some embodiments, selecting one of the entries in the dedication summary list 304 will also invoke sender interface 300*b*.

FIG. 3B illustrates another aspect of a simplified dedicator application 104 interface executed on dedicator device 302 according to an embodiment of the present disclosure, shown as sender interface 300*b*. FIG. 3B depicts sender interface 300*b* displaying a dedication-editing interface 318. Dedication-editing interface 318 provides a media-item browser invoker 322, a recording invoker 324, an attachment browser invoker 326, and a delivery-setup invoker 328. As depicted, dedication-editing interface 318 include affordances to invoke a media-content-item-selection interface (e.g., media-item browser invoker 322), which enables selection of a song title 320 (illustrated as song title 6) to create or generate a dedication.

Recording invoker 324 is a control to raise an interface to capture the user's dedication message through the device's microphone, camera, or other means. Attachment browser invoker 326 enables a user to raise an interface to allow the attachment of additional media to the user's dedication message. Selection of delivery-setup invoker 328 raises an interface that allows the specification of message-delivery conditions. The specific interfaces invoked by recording invoker 324, attachment browser invoker 326, and delivery-setup invoker 328 are not shown or described, as they will be understood by those of skill in the relevant art to be standard types of interfaces and layouts.

Sender interface 300b also includes a preview button 330, a save button 332, and a deletion button 334. Buttons 330-334 allow for the verification, retention and removal of dedications, respectively, as will also be understood by those of skill in the relevant arts.

Figure 4:
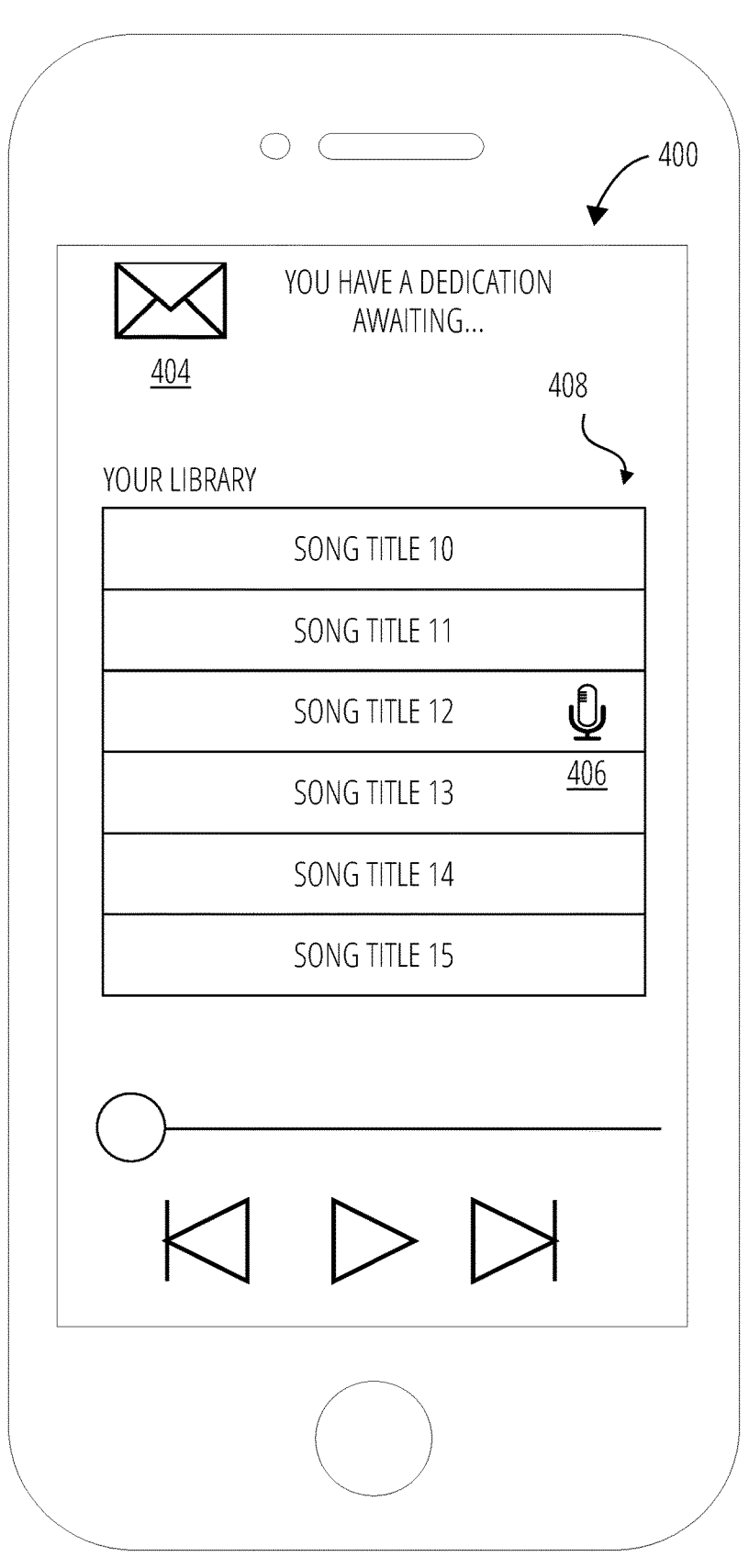
FIG. 4 illustrates a user interface for a recipient's notification, reception, and playback of a dedication according to an embodiment of the present disclosure.

FIG. 4 illustrates a simplified recipient interface 400 according to an embodiment of the present disclosure. FIG. 4 depicts a recipient device 402 executing a recipient application 108 which displays at least a portion of a library of media content items having some number of N media files. As shown in FIG. 4, there are media content items 408 having six song titles displayed of songs 10-15. One of skill in the relevant art will appreciate that while only six files are shown, media content items 408 may contain any number of media files.

Recipient interface 400 as shown in FIG. 4 may include any one or more dedication-available indicators. In some embodiments, recipient interface 400 may include a general dedication-available indicator 404 and/or media-item-specific dedication-available indicator 406. The availability of these indicators may depend upon the delivery settings specified by the message originator, who may opt to deny the recipient advance notice of dedications.

When dedication notifications are enabled, playback of a sender's message (e.g., user-defined media message 118 originally transmitted as user-defined media message 106) and an associated media-content item (e.g., media content item 116) occurs upon the recipient's selection of the dedication-available indicator 404 or a media content item to which a message is attached, as denoted by dedication-available indicator 406.

Figure 5:
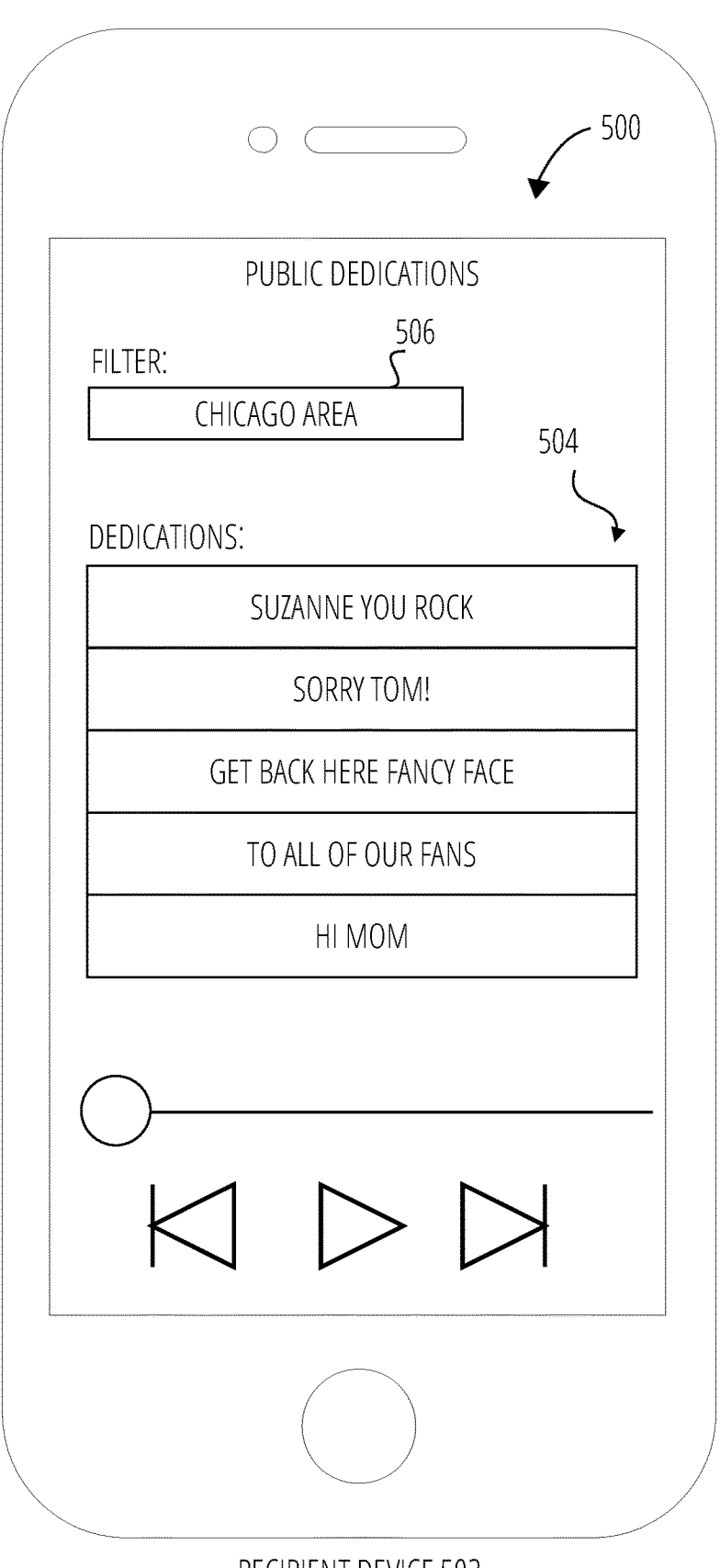
FIG. 5 illustrates a user interface for browsing and playing dedications made available to all users or a broad subset of users according to an embodiment of the present disclosure.

FIG. 5 illustrates a simplified dedication browser 500 according to an embodiment of the present disclosure. FIG. 5 depicts a recipient device 502 executing a recipient application 108 which displays a list of user-defined media messages in the form of a dedication list 504 made available to all or a broad subset of application instances. One of skill in the relevant art will appreciate that while only five dedication messages are shown, dedication list 504 may contain any number of user-defined media messages.

Dedication browser 500 may include one or more message filter selectors 506. In some embodiments, message filter selector 506 may contain geographic regions or other criteria which, when selected, alter the contents of dedication list 504.

Playback of a user-defined media message (such as user-defined media message 118) and its associated media content item (e.g., media content item 116) occurs upon selection of an entry from dedication list 504.

Figure 6:
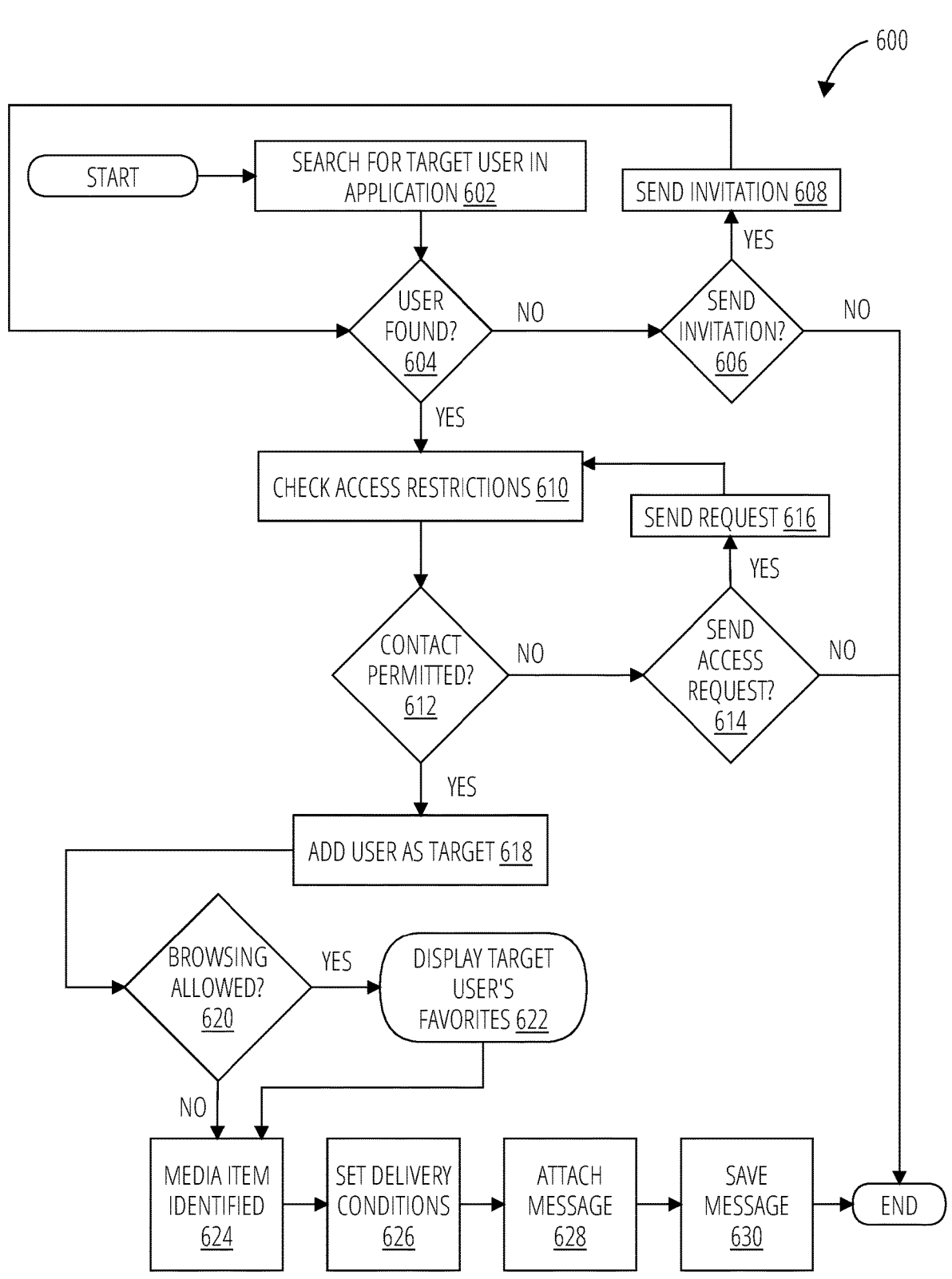
FIG. 6 is a flowchart illustrating a method of creating and saving a message according to an embodiment of the present disclosure.

FIG. 6 is a flowchart illustrating a method 600 of transmitting a message according to some embodiments of the present disclosure. At a general level, method 600 can include steps for selecting a message recipient, creating a message, specifying conditions for message delivery, and saving the message to the system. As an example, method 600 may be one performed by a user of dedicator application 104 in order to transmit a user-defined media message 106. Although the method 600 depicts a particular sequence of operations, the sequence may be altered without departing from the scope of the present disclosure. For example, some of the operations depicted may be performed in parallel or in a different sequence that does not materially affect the function of method 600. In other examples, different components of an example device or system that implements the method 600 may perform functions at substantially the same time or in a specific sequence.

According to some examples, method 600 includes performing a search for target user in an application at a step 602. For instance, the search could be performed in dedicator application 104 according to embodiments. According to some examples, method 600 includes determining where or not the desired target user was found at step 604. In some embodiments, the method includes determining whether or not to send an invitation to a target user at step 606 in the event the desired target user was not found. If an invitation should not be sent at step 606, the process ends. According to some examples, method 600 includes sending an invitation to the recipient application 108 of the desired target user at step 608, if step 606 determines that an invitation should be sent. The method 600 then returns to step 604 to await the outcome of an invitation being accepted, so that the user can be found.

According to some examples, if the desired target user is found at step 604, method 600 continues by checking access restrictions at a step 610. At a step 612, dedicator application 104 determines whether or not contact is permitted based on the check of access restrictions. In some embodiments, when contact is not permitted, method 600 continues by allowing a user to send an access request at step 614. If an access request should not be sent at step 614, the process ends. In embodiments, method 600 includes sending request at a step 616 if a access request is determined to be sent at step 614. Method 600 returns to step 610 once the request has been sent, until step 612 determines that contact is permitted (or that an access request should not be sent at step 614 in the event an initial request is denied, ending the method).

According to some embodiments, method 600 includes adding a user's application instance as target at step 618, if the contact is permitted at step 612. In some embodiments, the method includes determining whether browsing of the target's media sequences or media content items is allowed at a step 620. Method 600 continues by displaying a target user's favorites at step 622, if browsing a target's favorites is allowed.

If browsing a target's favorites is not allowed, or if the target user's favorites have already been displayed, a step 624 allows the dedicator application to identify a media content item for the dedication. In some embodiments, a playlist or other condition could be identified in place of identifying a single specific media content item. According to some examples, method 600 includes setting delivery conditions at step 626.

At a step 628, the method includes attaching a message (e.g., user-defined media message 106) to the media content item or playlist, according to some examples. In some embodiments, method 600 includes saving the message at a step 630. Once the message, such as user-defined media message 106, is saved at step 630, method 600 ends.

Figure 7:
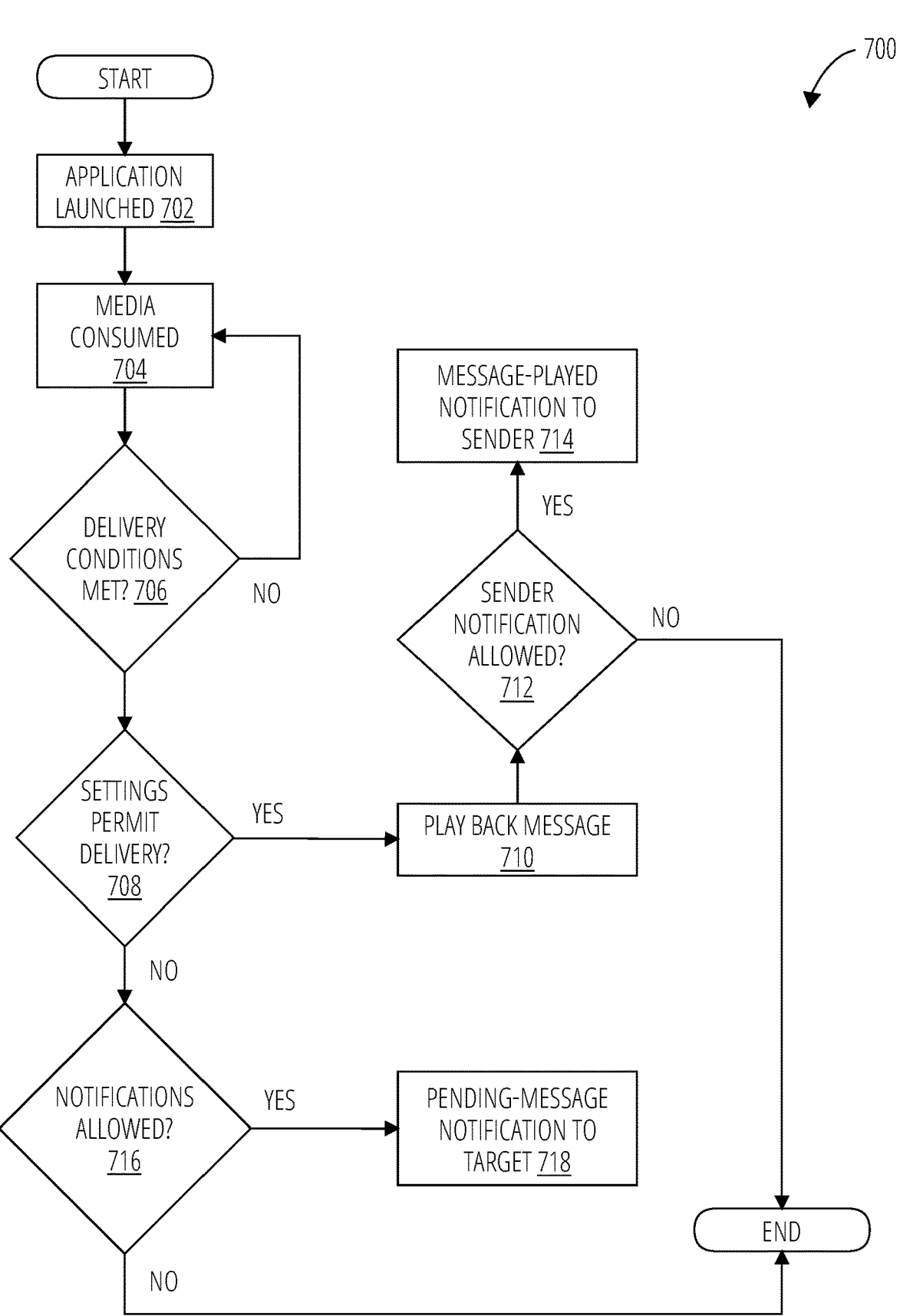
FIG. 7 is a flowchart illustrating a method of receiving and indicating a message according to an embodiment of the present disclosure.

FIG. 7 is a flowchart illustrating a method 700 of receiving and indicating a message according to an embodiment of the present disclosure. Again, although the method 700 depicts a particular sequence of operations, the sequence may be altered without departing from the scope of the present disclosure. For example, some of the operations depicted may be performed in parallel or in a different sequence that does not materially affect the function of method 700. In other examples, different components of an example device or system that implements the method 700 may perform functions at substantially the same time or in a specific sequence.

According to some examples, method 700 includes launching an application at step 702. For example, the recipient application 108 illustrated in FIG. 1 may be the application launched. According to some examples, method 700 further includes determining whether media files are consumed at step 704. For example, the recipient application 108 illustrated in FIG. 1 may used to determine if one or more media files are initiated.

According to some examples, method 700 includes determining whether the conditions for delivery are present at step 706. For example, are the conditions met for delivery of a user-defined media message 106. In some embodiments, the method includes determining whether settings of recipient application 108 permit delivery at step 708. For example, the recipient application 108 illustrated in FIG. 1 may include one or more settings related to how and when delivery is permitted. In some embodiments, settings of recipient application 108 may permit delivery of a user-defined media message 106 under circumstances, such as those described above and below.

According to some examples, method 700 includes playing back a message at step 710. For example, the recipient application 108 illustrated in FIG. 1 may play back user-defined media message 106. According to some examples, the method includes determining whether settings permit notification of a dedicator application 104 at step 712. For example, the recipient application 108 illustrated in FIG. 1 may have a configuration allowing for notification to dedicator application 104 in some embodiments. According to some examples, method 700 includes notification of a message being played at step 714. For example, the recipient application 108 illustrated in FIG. 1 may transmit a notification to dedicator application 104 that user-defined media message 106 has been played.

According to some examples, method 700 includes notifying that an allowed delivery is present at step 716. For example, the recipient application 108 illustrated in FIG. 1 may provide notification of a pending message notification for an allowed user-defined media message 106. In some embodiments, method 700 includes a pending message notification at step 718. For example, the recipient application 108 illustrated in FIG. 1 may indicate a pending message to reflect pending user-defined media message 106.

In one aspect, a method for the transmission and reception of media-dedication messages, the method includes generating or selecting, by a dedicator application, a user-defined media message, identifying application instances associated with one or more target users of media-playback software, hardware, or services, identifying one or more media content items that may be executed on the identified application instances associated with the one or more target users, and executing, via the identified application instances, the user-defined media message in conjunction with the identified media content items.

The method may also include identifying application instances associated with one or more target users through at least one or more of: a user ID, a name, an E-mail address, a phone number, a social-media account identifier, or other identifier, and filtering identified application instances associated with one or more target users by at least one or more of: a physical proximity, a registered interests or preferences, a past, present, or planned participation or attendance at an event, a connection to a local-area computer network, or other criteria.

The method may also include making the user-defined media message available to all instances of a recipient application. Alternatively, the method may include making the user-defined media message available to instances of a recipient application filtered by at least one or more of: physical proximity, geographic region, registered interests or preferences, past, present, or planned participation or attendance at an event, a connection to a computer network, or other criteria. Other technical features may be readily apparent to one skilled in the art from the following figures, descriptions, and claims.

The method may also include selecting a specific time, relative to the presentation of the media content item, at which to execute the user-defined media message. The method may also include specifying one or more conditions to be satisfied before user-defined media messages and associated media content items are executed.

The method may also include automatically executing a user-defined media message and associated media content item on a device other than the device executing the dedicator application. The method may also include where the user-defined media message is executed when an application instance associated with one or more target users is used to select for playback the media content item associated with the user-defined media message.

The method may also include presenting a notification on the application instances associated with one or more target users that another dedicator application instance has instantiated another user-defined media message to the application instance associated with the one or more target users, and allowing execution of the user-defined media message and any associated media content item through a user interface of the application instance associated with one or more target users. The method may also include sending a notification to the dedicator application that the application instance associated with one or more target users has executed a user-defined media message or a corresponding associated media content item, or is in the process of executing a user-defined media message or a corresponding associated media content item.

The method may also include where the system anonymously sends a message and/or media content item to the application instance associated with the one or more target users. The method may also further include displaying media available to the application instance associated with the one or more target users.

The method may also include applying effects to the user-defined media message, where the effects are at least one or more of audio reverb, auto-tune, musical or extraneous sound accompaniment, other audio processing, or image processing. Other technical features may be readily apparent to one skilled in the art from the following figures, descriptions, and claims.

In one aspect, a non-transitory computer-readable storage medium includes instructions that, when executed by a processor, cause the processor to capture, from a user, a media message or the selection of a media message, that message includes any combination of audio, video, or other computer-transmittable media, capture, from a user, criteria used to identify of another user or group of users as targets for the delivery of the media message, capture, from a user, criteria used to identify other users who are allowed to interact with that user, present, to a user, lists of other users who are available as potential recipients of that user's media messages, per the conditions and criteria specified by those users, capture from a user the identification of one or more target users, to whom a media message is directed, capture from a user the identification of a media content item to which the target users have access, capture from a user the association of a user-defined media message with a media content item or items to which the target users have access, monitor each target user's media consumption and any other criteria specified by another user for the presentation of a user-defined media message, present to the target user another user's media message, according to the conditions, criteria, and presentation-mode options captured from the message's originator and the target user.

In one aspect, a system includes a memory device. The system also includes a processing device operatively coupled to the memory device, the processing device to capture from a user a media message or the selection of a media message, that message consisting of any combination of audio, video, or other computer-transmittable media, capture from a user criteria used to identify of another user or group of users as targets for the delivery of the media message, capture from a user criteria used to identify other users who are allowed to interact with that user, present to a user lists of other users who are available as targets (potential recipients) of that user's media messages, per the conditions and criteria specified by those users, capture from a user the identification of one or more target users, to whom a media message is directed, capture from a user the identification of a media content item to which the target users have access, capture from a user the association of a user-defined media message with a media content item or items to which the target users have access, monitor each target user's media consumption and any other criteria specified by another user for the presentation of a user-defined media message, present to the target user another user's media message, according to the conditions, criteria, and presentation-mode options captured from the message's originator and the target user.

The method may also include instances where the conditions may be specified separately by or for each application instance associated with the one or more target users. The method may also include examples where the system accepts and applies conditions, specified by the dedicator application or application instances associated with one or more target users, for the execution of the user-defined media message and media content item on the application instances associated with one or more target users.

The method may also include instances where the conditions include at least one or more of: a recipient's geographic location, a time or date, weather at the recipient's location, whether the sending user has directly triggered presentation, a recipient's biometrics, a recipient's detected physical activity, or other criteria. The method may also include a system enabling the transmission and reception of media-dedication messages accepts and applies conditions specified by the dedicator application instance or application instances associated with one or more target users, the conditions specifying availability for discovery by other application instances of the system. The method may also include identifying, by the system, specific dedicator application instances or groups of dedicator application instances from which a user-defined media message will be allowed transmission to a particular application instance associated with target users.

The method may also include specifying whether incoming messages and media content are executed automatically by the system, specifying whether incoming messages and media content interrupt or override media already being executed, specifying whether notifications of incoming messages are provided, specifying whether the system will expose media consumption by the application instances associated with the one or more target users to other dedicator application instances, and specifying whether the system executes user-defined media messages transmitted anonymously.

The method may also include instances where a user-defined media message and associated media content item interrupt or override the playback of media being being executed by the application instance associated with the one or more target users. The method may also include embodiments where the interruption of media playback occurs with a transition. The method may also include examples where the transition may be of a variety of types selectable at the dedicator application. Other technical features may be readily apparent to one skilled in the art from the following figures, descriptions, and claims.

The method may also include presenting notifications on recipient application instances that another dedicator application instance has instantiated a public user-defined media message, and browsing public user-defined media messages. The further may also include allowing execution of a user-defined media message and any associated media content item through a user interface of the application instances. The method may also include browsing and filtering public user-defined media messages by at least one or more of: physical proximity, geographic region, registered interests or preferences, a past, present, or planned participation or attendance at an event, a connection to a computer network, or other criteria. Other technical features may be readily apparent to one skilled in the art from the following figures, descriptions, and claims.

While the above embodiments have been described with respect to specific examples and configurations, they should not be construed as limiting the present patent application. One of ordinary skill in the relevant art will appreciate that substitutions and variations for the described will be possible and within the scope of the disclosure.

What is claimed is:

1. A method for transmission and reception of media-dedication messages, the method comprising:
   generating or selecting, by a dedicator application, a user-defined media message;
   identifying application instances associated with one or more target users of media-playback software, hardware, or services;
   identifying one or more media content items that may be executed on the identified application instances associated with the one or more target users; and
   executing, via the identified application instances, the user-defined media message in conjunction with the identified media content items, wherein a user-defined media message and associated media content item interrupt or override playback of media being executed by the application instance associated with the one or more target users, wherein the interruption of media playback occurs with a transition, and wherein the transition may be of a variety of types selectable at the dedicator application.

2. The method of claim 1, further comprising:
identifying application instances associated with one or more target users through at least one or more of: a user identifier (ID), a name, an E-mail address, a phone number, a social-media account identifier, or other identifier; and
filtering identified application instances associated with one or more target users by at least one or more of: physical proximity; geographic region; registered interests or preferences; a past, present, or planned participation or attendance at an event; a connection to a computer network, or other criteria.

3. The method of claim 1, further comprising:
making the user-defined media message available to all instances of a recipient application; or
making the user-defined media message available to instances of a recipient application filtered by at least one or more of: physical proximity; geographic region; registered interests or preferences; past, present, or planned participation or attendance at an event; a connection to a computer network, or other criteria.

4. The method of claim 1, further comprising selecting a specific time, relative to presentation of the media content item, at which to execute the user-defined media message.

5. The method of claim 1, further comprising specifying one or more conditions to be satisfied before user-defined media messages and associated media content items are executed, wherein the conditions may be specified separately by or for each application instance associated with the one or more target users, and wherein the system accepts and applies conditions, specified by the dedicator application or application instances associated with one or more target users, for the execution of the user-defined media message and media content item on the application instances associated with one or more target users.

6. The method of claim 5, wherein the conditions include at least one or more of: a recipient's geographic location, a time or date, weather at the recipient's location, whether a sending user has directly triggered presentation, a recipient's biometrics, a recipient's detected physical activity, or other criteria.

7. The method of claim 6, wherein a system enabling the transmission and reception of media-dedication messages accepts and applies conditions specified by the dedicator application or application instances associated with one or more target users, the conditions specifying availability for discovery by other application instances of the system.

8. The method of claim 7, further comprising identifying, by the system, specific dedicator application instances or groups of dedicator application instances from which a user-defined media message will be allowed transmission to a particular application instance associated with target users.

9. The method of claim 8, further comprising:
specifying whether incoming messages and media content are executed automatically by the system;
specifying whether incoming messages and media content interrupt or override media already being executed;
specifying whether notifications of incoming messages are provided;

specifying whether the system will expose media consumption by the application instances associated with the one or more target users to other dedicator application instances; and
specifying whether the system executes user-defined media messages transmitted anonymously.

10. The method of claim 1, further comprising automatically executing a user-defined media message and associated media content item on a device other than the device executing the dedicator application.

11. The method of claim 1, wherein the user-defined media message is executed when an application instance associated with one or more target users is used to select for playback the media content item associated with the user-defined media message.

12. The method of claim 1, further comprising:
presenting notifications on recipient application instances that another dedicator application instance has instantiated a public user-defined media message; and
browsing public user-defined media messages; and
allowing execution of a user-defined media message and any associated media content item through a user interface of the recipient application.

13. The method of claim 12, further comprising:
browsing and filtering public user-defined media messages by at least one or more of: physical proximity; geographic region; registered interests or preferences; a past, present, or planned participation or attendance at an event; a connection to a computer network, or other criteria.

14. The method of claim 1, further comprising:
presenting a notification on the application instance associated with one or more target users that another dedicator application instance has instantiated another user-defined media message to the application instance associated with the one or more target users; and
allowing execution of the user-defined media message and any associated media content item through a user interface of the application instances associated with one or more target users.

15. The method of claim 1, further comprising sending a notification to the dedicator application that the application instance associated with one or more target users has executed a user-defined media message or a corresponding associated media content item, or is in process of executing a user-defined media message or a corresponding associated media content item.

16. The method of claim 1, wherein the system anonymously sends a message, a media content item, or a combination of a message and a media content item to the application instance associated with the one or more target users.

17. A non-transitory computer-readable storage medium comprising instructions that, when executed by a processor, cause the processor to:
capture, from a user, a media message or selection of a media message, that message comprising any combination of audio, video, or other computer-transmittable media;
capture, from a user, criteria used to identify of another user or group of users as targets for delivery of the media message;
capture, from a user, criteria used to identify other users who are allowed to interact with the user from which the criteria are captured;

present, to a user, lists of other users who are available as potential recipients of that user's media messages, per conditions and criteria specified by those users;

capture from a user identification of one or more target users, to whom a media message is directed;

capture from a user identification of a media content item to which the target users have access;

capture from a user association of a user-defined media message with a media content item or items to which the target users have access;

monitor each target user's media consumption and any other criteria specified by another user for presentation of a user-defined media message;

present to the target user another user's media message, according to the conditions, criteria, and presentation-mode options captured from message's originator and the target user.

18. A system, comprising:

a memory device;

a processing device operatively coupled to the memory device, the processing device to:

capture from a user a media message or selection of a media message, that message consisting of any combination of audio, video, or other computer-transmittable media;

capture from a user criteria used to identify of another user or group of users as targets for delivery of the media message;

capture from a user criteria used to identify other users who are allowed to interact with the user from which the criteria are captured;

present to a user lists of other users who are available as targets (potential recipients) of that user's media messages, per conditions and criteria specified by those users;

capture from a user identification of one or more target users, to whom a media message is directed;

capture from a user identification of a media content item to which the target users have access;

capture from a user association of a user-defined media message with a media content item or items to which the target users have access;

monitor each target user's media consumption and any other criteria specified by another user for presentation of a user-defined media message;

present to the target user another user's media message, according to the conditions, criteria, and presentation-mode options captured from message's originator and the target user.

* * * * *